Oct. 13, 1959   R. J. KIRCHER   2,908,860
TESTING APPARATUS
Filed Oct. 10, 1955
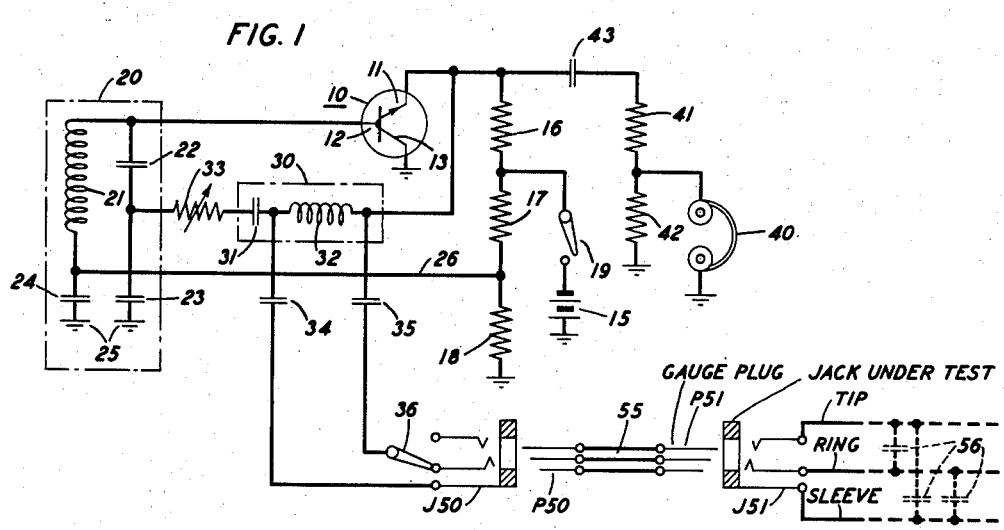
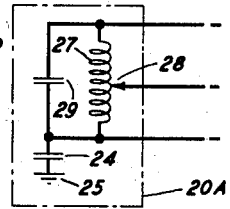
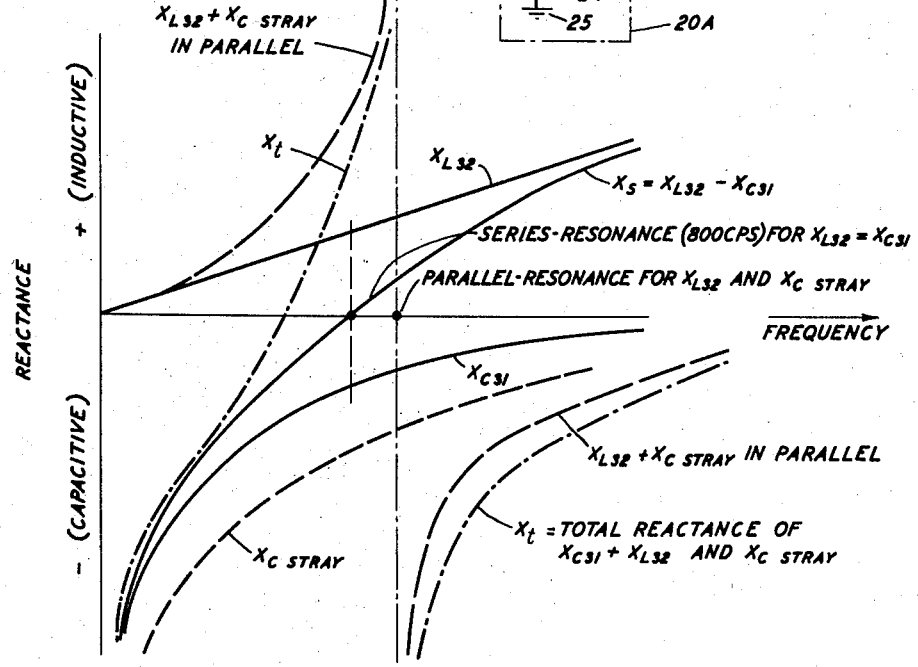
INVENTOR
R. J. KIRCHER
BY
ATTORNEY

United States Patent Office 2,908,860
Patented Oct. 13, 1959

2,908,860
TESTING APPARATUS

Reymond J. Kircher, Summit, N.J., assignor to Bell Telephone Laboratories, Incorporated, New York, N.Y., a corporation of New York Application October 10, 1955, Serial No. 539,749

7 Claims. (Cl. 324—28)

This invention relates to apparatus for testing electrical contact-making devices having wiring capacity associated therewith, and more specifically to such apparatus employing a transistor oscillation generator.

A system often employed for the testing of switchboard jacks utilizes a number of gauges in the form of plugs, the ring, tip, and sleeve elements of which are specially designed and built so as to make electrical contact with the corresponding jack elements in the same manner as an ordinary switchboard plug. A test set comprising a vacuum tube oscillator for producing an audible tone is connected to the gauge plug in such a way that the wiring capacity of the circuits connected to the switchboard jacks shunts the high impedance grid circuit of the oscillator and effectively stops oscillations whenever a satisfactory electrical contact is established between the gauge plug and the jack under test. Rotation of the gauge plug in the jack causes immediate oscillator response at all points at which the jack contacts open due to faulty alignment. An operator is provided with a headphone receiver connection to the oscillator to listen for the oscillator tone, which indicates faulty jack alignment. Other indicating means are sometimes used such as an oscilloscope or a rectifier and milliammeter combination.

The vacuum tube oscillator of the prior art requires bulky filament and plate batteries for the test set, which is preferably portable. Since there is a heavy drain on these batteries when the test set is being used regularly, batteries must be replaced at frequent intervals. The vacuum tube also is comparatively bulky and requires considerable warmup time before the oscillations become stabilized initially.

A principal object of this invention is to obtain a simple but effective control of an oscillation generator for such an application and to attain a much more positive and non-critical operation of the test set.

A related object is to provide an oscillation generator which is simple, rugged, and compact, and which starts producing stable oscillations as soon as it is switched into operating condition.

A still further object is to increase the sensitivity and speed of response of such an oscillator to low values of wiring capacity.

In the illustrative embodiment of the invention described hereafter in more detail, the central element of the testing apparatus is a junction transistor connected in a grounded collector configuration. An example of a junction transistor is described in detail in United States Patent 2,569,347, which was issued to William Shockley on September 25, 1951.

The illustrative circuit resembles basically a Colpitts oscillator modified by the addition of a series-resonant circuit connected in the feedback path. The series-resonant circuit is normally resonant at the same frequency as the primary frequency-determining circuit of the oscillator and the resistance in the feedback path is adjusted so that oscillations are just maintained in a stable condition. A switchboard jack or other contact-making device is tested by connecting it so that its wiring capacity is effectively in shunt with a part of the series-resonant circuit, such as the inductive element. If the device being tested is in proper working condition, the wiring capacity will so load the series-resonant circuit as to shift its resonant frequency sufficiently to block oscillations. Audible or visual indicating means for indicating the presence of oscillations therefore tell the operator whether or not the device under test is working properly.

Although other circuit configurations, as well as other types of transistors, can be employed, the grounded collector configuration permits the use of a low impedance telephone headset to monitor oscillations. Further, the high current gain of the junction transistor $$\left(\frac{\alpha}{1-\alpha}\right)$$

in the grounded collector configuration permits the feeding back of a fraction of the emitter current to sustain oscillations with the balance being available for the load, i.e., the headset. Point contact transistors are at present less desirable for this application since they have somewhat higher power requirements and an $\alpha$ exceeding unity. The latter factor results in a tendency to short-circuit instability and thus reduces its desirability as an oscillator element.

A feature of the invention is that the oscillator is extremely sensitive, although it may be easily adjusted to be less sensitive if desired, and thus responds readily to the wiring capacity of the device being tested.

The invention will be fully apprehended from the following detailed description of certain embodiments thereof, taken in connection with the appended drawings, in which:

Fig. 1 is a schematic diagram of a transistor oscillator of the Colpitts type embodying the invention;

Fig. 2 is a modification of the circuit of Fig. 1 showing a Hartley type of frequency-determining circuit; and Fig. 3 is an impedance diagram aiding in the understanding of the invention.

Fig. 1 of the drawing illustrates an embodiment of the present invention in which a transistor amplifier element 10 comprises a small bar of single crystal germanium, for example, which contains a thin layer of P-type interposed between regions of N-type, provided with mechanically strong ohmic connections made to the three regions. The base electrode 12 is connected to the P-type center region and the emitter and collector electrodes 11 and 13 to each of the N-type regions. Operating bias for the emitter 11 and the base 12 with respect to the collector 13, taken as a ground reference terminal, is supplied by a suitable battery 15, in this case a standard 4.5-volt battery, with positive terminal grounded to the same reference point as the collector electrode 13. Negative bias is supplied to the emitter through on-off switch 19 and resistor 16 in the form of a constant current, the value of resistor 16 being chosen greater than the output impedance of the emitter circuit. Operating bias is supplied to the base electrode 12 from the same battery 15 through a voltage divider comprising resistors 17 and 18 in series between resistor 16 and ground. The bias at the base 12 is thus maintained fixed at a potential slightly less negative with respect to the collector than the emitter. Connection is made from the junction point of resistors 17 and 18 to the base 12 through conductor 26. Blocking capacitor 24 connected between the junction point of resistors 17 and 18 isolates the base bias from ground.

It is to be understood that transistor 10 could be a P–N–P type in which case the battery 15 would be connected with reversed polarity. The conventional transistor symbol with arrowhead on the emitter electrode 11 pointing away from the base represents a P-type base region and indicates the direction of forward current flow for the emitter electrode.

The frequency-determining network comprises a parallel resonant circuit 20 in the base-to-collector path of the transistor 10. A feedback path from this resonant circuit to the emitter electrode 11 causes the circuit to be self-oscillating. Fig. 1 illustrates a Colpitts type oscillator circuit wherein resonant circuit 20 comprises a coil 21 and the series combination of capacitors 22 and 23 in shunt with the coil. The required feedback connection to the emitter 11 is made from the junction point of capacitors 22 and 23 directly to the emitter. Resistor 33, shown variable, is provided to limit the amount of feedback current and hence the amplitude of oscillation to preserve purity of the output waveform and to allow just sufficient feedback to sustain oscillations. Resistor 33 may be used to adjust the sensitivity of the oscillator circuit. The present invention is concerned with the series-resonant circuit 30 included in the feedback path for the application of the basic oscillator circuit to the testing of switchboard jacks and the like.

The operation of the circuit as a generator of oscillations is as follows. Any electrical disturbance at the base 12, such as that resulting from connecting the battery 15 to base 12 and emitter 11, alters the current flow in the emitter-to-collector path. Small changes at the base effect greatly amplified changes in the emitter-to-collector current. The amplified changes in the emitter-collector current shock the tank circuit 20 into oscillation in a well-known manner. A portion of the emitter current change is coupled back to the tank circuit through the series-resonant circuit 30 and resistor 33 to sustain oscillations. The inductance and capacitance of coil 21 and capacitors 22 and 23 in series, respectively, are chosen to maintain oscillations at an audio frequency rate such as 800 cycles per second in the specific embodiment. In order to cause sustained self-oscillation the series-resonant circuit is also tuned to the same frequency as tank circuit 20. Coil 32 of series-resonant circuit 30 is preferably of low resistance of the order of 150 ohms. Variable resistor 33 is adjusted to just sustain oscillations when series-resonant circuit 20 is tuned to 800 cycles per second.

Fig. 2 illustrates a variation 20A for parallel resonant circuit 20 which might be employed to produce a Hartley type of oscillator. A single capacitor 29 in parallel with a tapped coil 27 replaces the coil 21 and the capacitors 22 and 23 of tuned circuit 20. The feedback connection 28 is preferably tapped down on coil 27 to produce the correct amount of feedback. It would be obvious to one skilled in the art that other tank circuit connections could be made to produce an oscillator suitable for the application described in this invention without departing from the scope thereof. Tickler and reversed feedback circuits, however, require an additional winding coupled to the tuned circuit.

A substantial part of the emitter-collector current flows in the circuit comprising resistors 16, 17, and 18, to produce an audio voltage. This voltage may be coupled to receiver headset 40 as a load by which the oscillations are made audible. Headset 40 in a particular instance is of low impedance and is readily coupled to the emitter 11 by capacitor 43 blocking the battery voltage from the headset and a voltage divider comprising resistors 41 and 42 to obtain a proper impedance match to the headset 40. It is to be understood that other indicating devices, such as a meter or an oscilloscope may be employed and also that alternative methods of coupling the load to the oscillator circuit are well known in the art.

In accordance with the principles of this invention, jack J51 under test, having associated with it the switchboard and line wiring capacity 56, is connected across coil 32 in the series-resonant circuit 30. Plug P51 is a steel gauge plug having the minimum dimensions of a standard brass plug designed to make contact with the switchboard jack tip, ring, and sleeve elements. If the gauge plug elements make contact with the corresponding switchboard jack elements at all points while being rotated in the jack, the jack is in satisfactory adjustment. Steel gauge plug P51 is connected by way of patch cord 55 to a standard plug P50 designed to mate with jack J50 on the test set. Jack J50 is in turn connected through a selector switch 36, two elements at a time, through coupling capacitors 34 and 35 in parallel with coil 32 in the oscillator feedback path.

As long as an open circuit exists across the elements of jack J50, oscillations are produced. The manner in which oscillations are made to cease when the wiring capacitance associated with switchboard jack J51 is connected in parallel with coil 32 is best described in connection with Fig. 3.

Fig. 3 is a reactance-frequency diagram of the operation of series-resonant circuit 30 in the oscillator feedback path, with and without the introduction of the wiring capacity of the device under test. The abscissa represents frequency and the ordinate, reactance. Inductive reactance is indicated above the frequency axis and capacitive reactance, below the frequency axis. Curves marked $X_{L32}$, $X_{C31}$, and $X_S$ are a conventional plot of the reactances of the elements of a series-resonant circuit and the manner of their addition. Inductive reactance $X_L = \omega L$, where $\omega = 2\pi$ times the frequency of the current flowing through the coil, and $L =$ the inductance of the coil. Therefore, a straight line $X_{L32}$ represents the variation of inductive reactance of coil 32 with frequency. Capacitive reactance $X_C$ is equal to $$\frac{1}{\omega C}$$

A curve of capacitive reactance is a hyperbola, conventionally drawn in a negative quadrant. Curve $X_{C31}$ represents the capacitive reactance of capacitor 31. The total reactance of circuit 30 is represented by the curve $X_S$. It is seen that at one point $X_S$ crosses the frequency axis where the capacitive and inductive reactances are equal. This is the frequency of resonance, here shown as 800 cycles per second to correspond to the resonant frequency of the parallel-resonant circuit 20. Feedback at this frequency, therefore, is limited only by the small resistance of coil 32 and resistor 33 in series therewith.

When, however, the wiring capacitance associated with a satisfactory switchboard jack, for example, is considered as placed in parallel with coil 32, the resulting reactance of the feedback path is much greater than that of coil 32 alone over a wide range of wiring capacitance values. The dashed curve "$X_{C\ stray}$" represents the capacitive reactance of the jack wiring capacitance plus the capacitances of coupling capacitors 34 and 35, which are chosen to be of negligible reactance compared to capacitor 31. Hence, curve $X_{C\ stray}$ lies below curve $X_{C31}$. $X_{C\ stray}$ forms with coil 32 a parallel combination of inductance and capacitance. Therefore, the reciprocals of reactances of coil 32 and the wiring capacitance add to produce the reciprocal of their total reactance. Curves of this parallel combination of reactances are represented by the dashed curves on Fig. 3. The combined reactances tend towards infinity at the parallel-resonant point, which is here shown as higher than 800 cycles per second.

The total reactance of the feedback path when the parallel circuit comprising coil 32 and the stray wiring capacitance is combined in series with capacitor 31. The dash-dot curve designated $X_t$ results from this addition. A resonant point much below 800 cycles per second results. Therefore, the reactance of the feedback path is changed from that of curve $X_s$ to that of curve $X_t$ when the stray wiring capacitance is introduced. It is evident from these two curves that $X_t$ exceeds $X_s$ at 800 cycles per second, the frequency of resonance of the oscillator circuit, so that oscillations will be cut off abruptly by the introduction of the wiring capacitance of the jack under test into the feedback path.

The total impedance of the feedback path is the reactance of either the $X_s$ or $X_t$ curves plus the resistance of feedback resistor 33. Since resistor 33 was adjusted to just allow oscillation when circuit 30 is resonant at 800 cycles per second, any value of jack wiring capacity above some minimum will cause oscillations to cease. It can be arranged so that wiring capacities in excess of 70 micromicrofarads will produce this effect. The relatively low base-to-collector input impedance, compared with the high input impedance of a vacuum tube, makes the use of a series impedance in the feedback path a sensitive and broad control element.

Even if the jack circuit should be shorted, the capacitance of capacitor 31 is such as to stop oscillation.

Switch 36 permits the testing of tip and ring circuits separately.

The following circuit values have been found to give satisfactory operation:

| | |
|---|---|
| Capacitors 24, 43 | 4.0 mfd. |
| Capacitors 31, 34, 35 | 0.025 mfd. |
| Capacitors 22, 23 | 0.20 mfd. |
| Coil 31 | 2.0 henries. |
| Coil 21 | 0.396 henry. |
| Resistors 16, 17 | 5100 ohms. |
| Resistor 18 | 3900 ohms. |
| Resistors 41, 42 | 300 ohms. |
| Resistor 33 | 5000 ohm carbon rheostat. |
| Battery 15 | 4.5 volts. |
| Transistor 10 | Western Electric N–P–N type 1858. |

It will be apparent to one skilled in the art that the principles of the invention may be applied to the testing of other contact devices having associated wiring capacity where a positive indication of malfunction, audible or otherwise, is desirable.

What is claimed is:

1. Apparatus for testing electrical contact-making devices each having a wiring capacity associated therewith comprising a transistor oscillator having three electrodes, a parallel-resonant two-terminal frequency-determining network connected between two of said electrodes for oscillation at a predetermined frequency, a connection point intermediate the two terminals of said frequency-determining network, a series-resonant combination of an inductor and a capacitor interconnecting said connection point and a third electrode, said inductor and said capacitor being series-resonant at the frequency of said frequency-determining network to sustain the predetermined oscillations thereof, a load coupled to two of said electrodes, said load including means for indicating the presence of the predetermined oscillations in said generator frequency-determining network, and means for causing said oscillations to cease and produce thereby in said load an indication of an improperly functioning device under test, comprising conductive means for connecting said last-mentioned device to said inductor and thereby shunting said inductor with said wiring capacity associated with said last-mentioned device.

2. The apparatus defined in claim 1 in which said parallel-resonant network comprises a coil and two series-connected capacitors in shunt with said coil, and said connection point is a common terminal of said two capacitors.

3. The apparatus defined in claim 1 in which said parallel-resonant network comprises a parallel combination of a coil and a capacitor and said connection point is a tap on said coil intermediate the ends thereof.

4. The apparatus defined in claim 1 in which a variable resistance is included in series with said series-resonant circuit, said resistance being adjusted to sustain oscillations when said series-resonant circuit is tuned to the frequency of said frequency-determining network.

5. The apparatus defined in claim 1 in which said frequency-determining network is connected between the base and collector electrodes of said transistor and said series-resonant circuit is connected between said connection point and the emitter electrode of said transistor.

6. Apparatus for testing jacks each having wiring capacity associated therewith comprising a transistor oscillator having a base electrode, an emitter electrode, and a collector electrode cooperatively associated therewith, a reactive frequency-determining circuit connected between said base and said collector electrodes for oscillation at a predetermined frequency, an intermediate connection point for said frequency-determining circuit, a feedback path interconnecting said connection point and said emitter electrode, said feedback path comprising a series combination of an inductor and a capacitor and an adjustable resistor, said inductor and capacitor being series-resonant at the frequency of said frequency-determining circuit to sustain the predetermined oscillations thereof, a load coupled to two of said electrodes, said load including transducer means for audibly reproducing the oscillations generated of said frequency-determining circuit, and means for causing said oscillations to cease and produce thereby in said transducer means an indication of an improperly functioning jack under test, comprising conductive means for connecting each jack under test to said inductor and thereby shunting said inductor with said wiring capacity associated with said last-mentioned jack.

7. The apparatus according to claim 6 in which each of said jacks has a plurality of contacts and a wiring capacity associated with each pair of said contacts, and said connecting means includes means for connecting each contact pair of each jack under test to said inductor and thereby shunting said inductor with said wiring capacity associated with each said last-mentioned contact pair.

References Cited in the file of this patent

UNITED STATES PATENTS

| | | |
|---|---|---|
| 2,239,193 | Dunlap | Apr. 22, 1941 |
| 2,587,697 | Conrad | Mar. 4, 1952 |
| 2,755,384 | Pierson | July 17, 1956 |

OTHER REFERENCES

West: "Radio and Television News," October 1953, pp. 60–62.

Oakes: "Proceedings of the I.R.E.," August 1954, pp. 1235–1238.